John F. Coppock — Animal-Trap
No. 119,826. Patented Oct. 10, 1871.
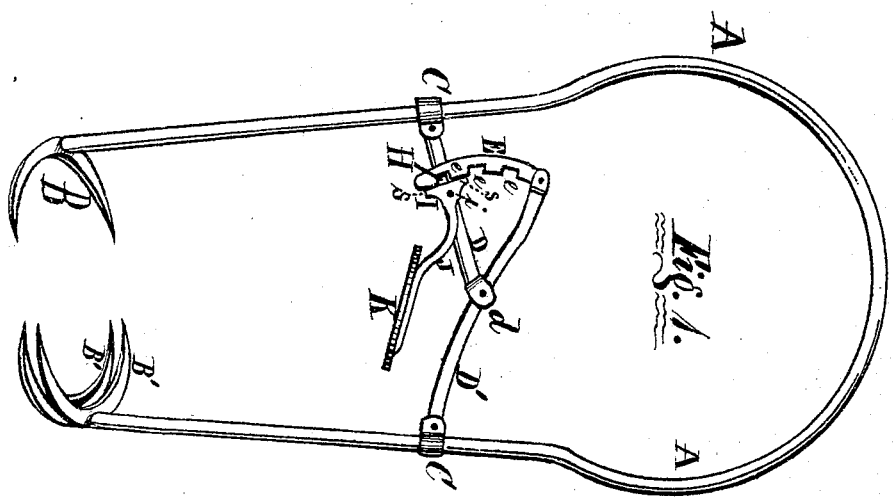
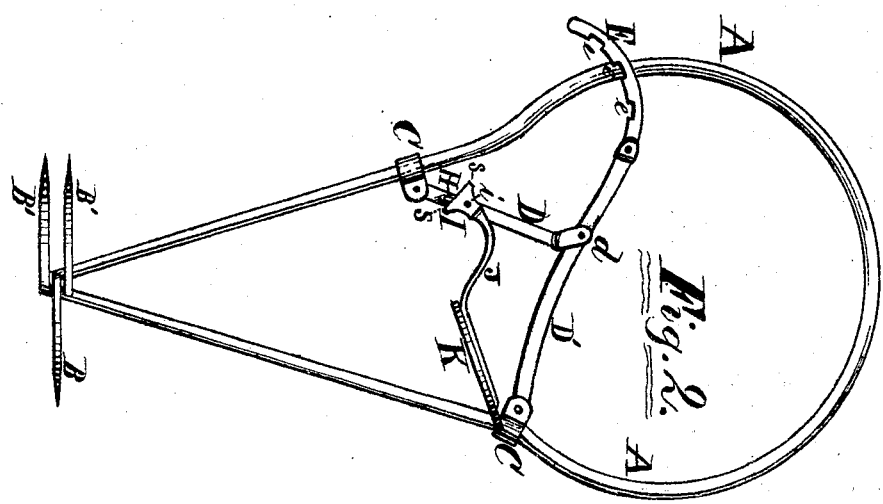
Witnesses,
Platt R. Richards.
J. J. Tunnicliff.
Inventor,
John F. Coppock,
by W. B. Richards,
his Atty.

UNITED STATES PATENT OFFICE.

JOHN F. COPPOCK, OF DEXTER, IOWA.

IMPROVEMENT IN ANIMAL-TRAPS.

Specification forming part of Letters Patent No. 119,826, dated October 10, 1871.

*To all whom it may concern:*

Be it known that I, JOHN F. COPPOCK, of Dexter, in the county of Dallas and State of Iowa, have invented certain Improvements in Animal-Traps, of which the following is a specification:

The nature of my invention relates to that class of traps which is set in a hole in such manner that the animal in attempting to pass will disengage the trap-triggers and be clasped by the teeth provided for that purpose; and the invention consists in a curved spring-bar so curved that when the trap is sprung the ends of the spring-bar come together and, being armed with interlocking curved arms, sieze and hold the animal, suitable trigger arrangements being provided in combination therewith, all as hereinafter fully described; the object being to provide a trap more particularly for catching gophers, but which may also be used for other animals.

Figure 1 is partly a perspective and partly a side elevation of my invention, showing the trap set. Fig. 2 is the same view of the trap as Fig. 1, except that the trap is shown sprung.

A represents a bar of spring-steel, bowed or curved in such manner that the two ends thereof come together when free. B B' B' represent curved arms—arcs of circles—carried on the ends of the bow A. C C represent clasps sliding freely on the side arms of the bow A. D D' are toggle arms, one end of each of which is pivoted to a clasp, C C, and the other end of the one D is pivoted at $d$ to the central portion of D'. E is a curved trigger-bar pivoted at one end in the end of the bar D', and provided with recesses $e\ e\ e$ on its concave side. H is a detent lug on and near the central part of the bar D. I is a dog pivoted at $i$ on the bar D. J is a trip-lever extending from the side of the dog I and carrying on its free end a disk or plate, K.

The operation of my invention is as follows: The toggle-arms D D' being brought down to the position shown at Fig. 1, one of the recesses $e$ may then be engaged with the detent H, and in this position of the different parts the shoulders $s\ s$ of the dog I will rest against the concave side of the trigger-bar E and the trap is set. It will now be plainly seen that moving the plate K either toward or from the bars D D' will bring one of the shoulders $s\ s$ to bear against the trigger-bar E, and releasing it (the trigger-bar) from the detent H will spring the trap. The distance of the arms B B' apart when the trap is set may be adjusted by engaging different ones of the series of recesses $e\ e\ e$ with the detent H; and the distance of the bait-plate or disk K from the arms B may be adjusted by sliding the clasps C C on the side arms of the bow A.

The most effectual method of trapping gophers with this device is as follows: It is well known by those acquainted with this animal's habits that in burrowing and excavating his passages under the surface of the soil he deposits the mold in chambers or holes extending short distances from the main gallery by pushing the mold compactly therein, and that if one of these side chambers is emptied he will again fill it. Now, when one of these side chambers is emptied, if the trap is placed therein with the arm B end toward its entrance, it will be plainly seen that in pushing the dirt or mold forward he will pass his head and shoulders between the arms B B' and, pressing the dirt or any part of his person against the disk K, will spring the trap, and he will be clasped securely between the arms B B'.

The methods of setting this trap at or in holes frequented by other animals will readily suggest themselves.

I claim as my invention—

The bow A armed with arms B B' B', the clasps C C, toggle-arms D D', trigger-bar E, lug H, dog I, tripper-lever J, and disk K, when combined and arranged to operate substantially as described and for the purpose specified.

JOHN F. COPPOCK.

Witnesses:
PLATT R. RICHARDS,
J. J. TUNNICLIFF.

(25)